United States Patent [19]
Heldt et al.

[11] Patent Number: 5,752,737
[45] Date of Patent: May 19, 1998

[54] DOOR REINFORCEMENT SYSTEM FOR PICK-UP TRUCKS

[75] Inventors: Gary Eugene Heldt, Livonia; Ryan Spencer Marshall, Novi; Tadeusz Joseph Siedlecki, Dearborn; David Rush, Bingham Farms, all of Mich.

[73] Assignee: Ford Global Technologies, Inc., Dearborn, Mich.

[21] Appl. No.: 955,420

[22] Filed: Oct. 22, 1997

Related U.S. Application Data

[63] Continuation of Ser. No. 589,442, Jan. 22, 1996, abandoned.

[51] Int. Cl.$^6$ ............................................. B60J 5/04
[52] U.S. Cl. ................ 296/146.6; 296/188; 296/202; 49/503; 292/DIG. 67; 70/DIG. 65
[58] Field of Search ............................. 500/589, 442; 296/146.5, 146.6, 202, 188; 292/DIG. 67; 70/DIG. 65; 49/503

[56] References Cited

U.S. PATENT DOCUMENTS

| | | | |
|---|---|---|---|
| 1,639,037 | 8/1927 | Hollingshead | 296/202 |
| 1,869,274 | 7/1932 | Phillips | 296/202 |
| 1,974,253 | 9/1934 | Sandor | 70/DIG. 65 |
| 4,930,836 | 6/1990 | Grinn | 296/183 |
| 5,297,841 | 3/1994 | Siedlecki | 296/146.6 |
| 5,364,157 | 11/1994 | Siedlecki | 296/146.6 |
| 5,398,988 | 3/1995 | DeRees et al. | 296/155 |
| 5,524,960 | 6/1996 | Townsend | 296/155 |

*Primary Examiner*—Dennis H. Pedder
*Attorney, Agent, or Firm*—Daniel M. Stock, Esq.; Roger L. May, Esq.

[57] ABSTRACT

A door reinforcement system for closing an aperture in a side of a body of a pick-up truck includes a first door and a second door pivotally connected to the body and joined pillarlessly between an open position and a closed position, a vertical reinforcement beam disposed within one of the first door and the second door, and a door latch striker connected directly to the vertical reinforcement beam and a door latch connected to the other one of the first door and the second door to engage the door latch striker to resist inward movement of the first door and second door from the closed position with respect to the body of the pick-up truck.

6 Claims, 4 Drawing Sheets

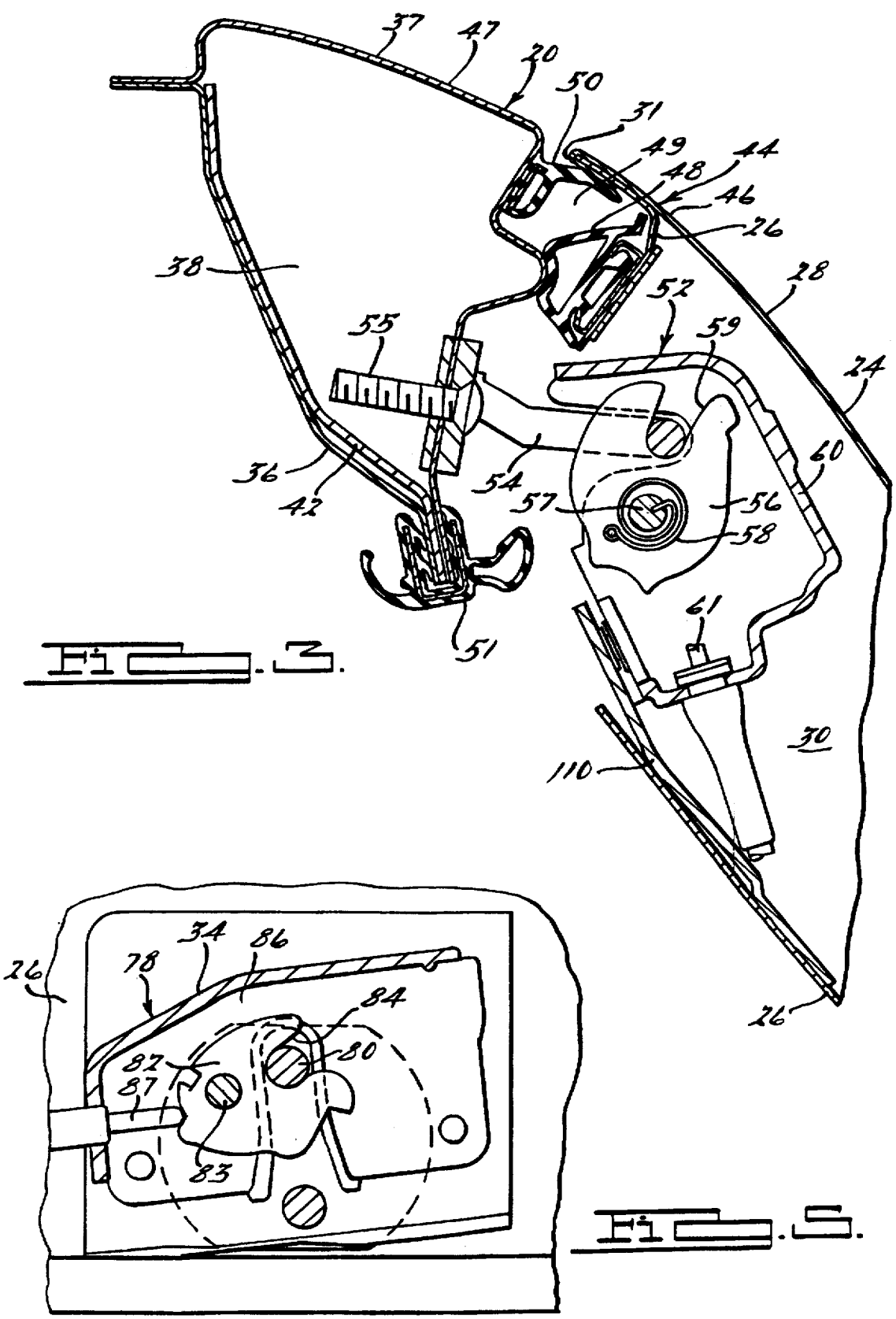

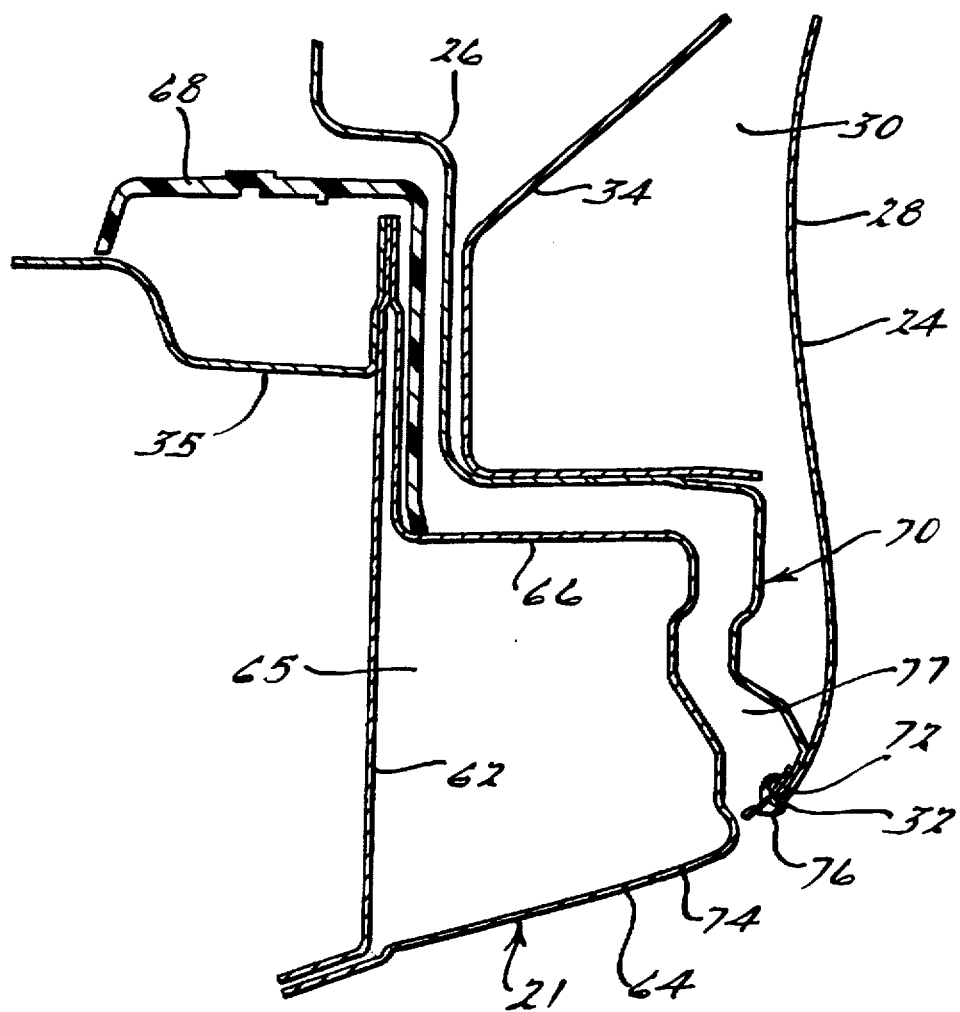

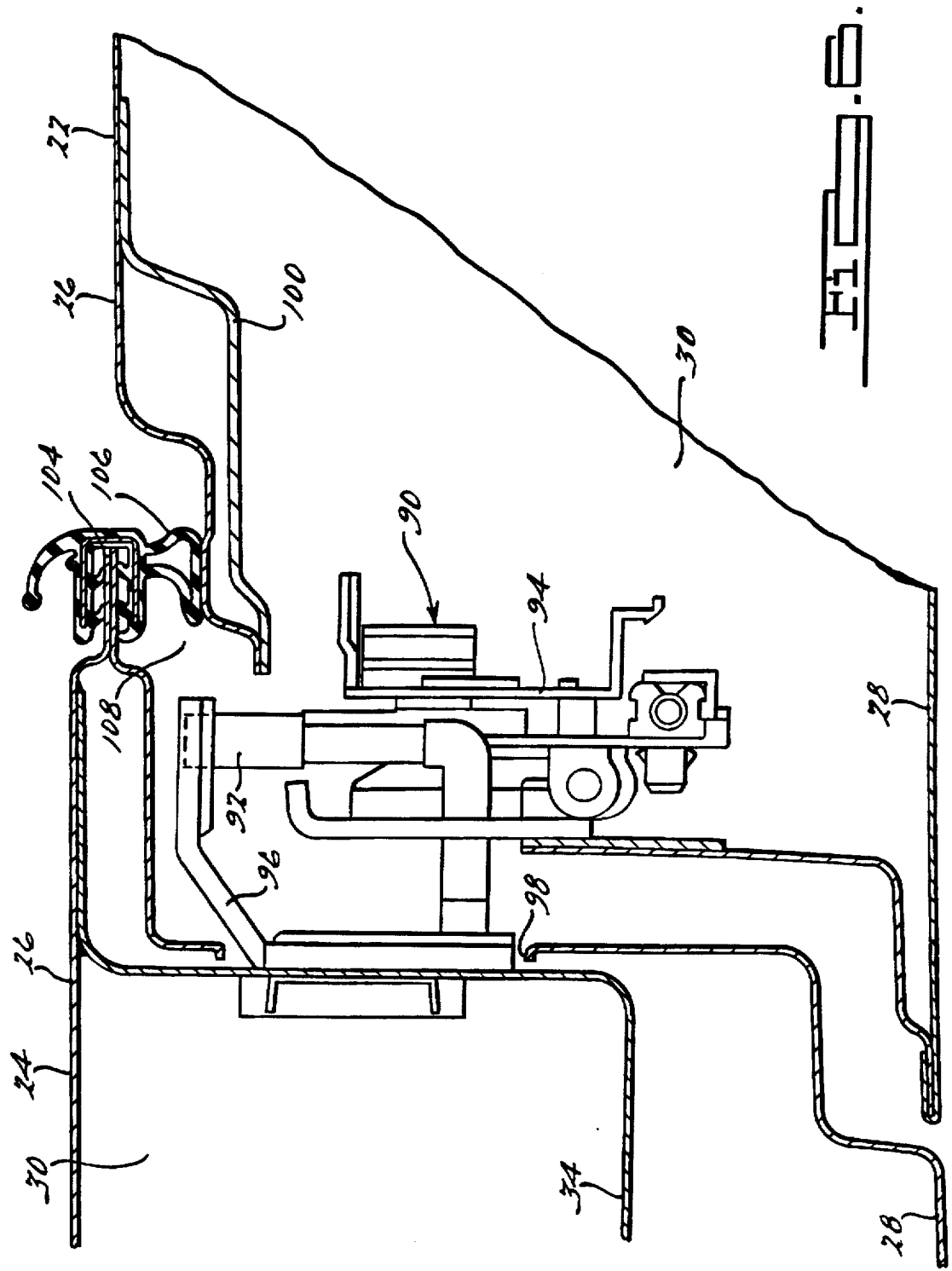

5,752,737

1

DOOR REINFORCEMENT SYSTEM FOR PICK-UP TRUCKS

This is a continuation of U.S. patent application Ser. No. 08/589,442, filed Jan. 22, 1996 now abandoned.

BACKGROUND OF THE INVENTION

1. Field of the Invention

The present invention relates generally to vehicles and, more specifically, to reinforcement of vehicle doors arranged in a side of pick-up trucks.

2. Description of the Related Art

It is known to provide a vehicle such as a pick-up truck with a body having a door opening. It is also known to provide a pair of doors pivotally connected to the body to open and close the door opening. Typically, a front door is pivotally mounted on a vertical front pillar through hinges and a rear door is pivotally mounted on a vertical rear pillar through hinges and joined pillarlessly in a closed position. Each door has an inner panel and outer panel which are joined together to form a space there between.

It is further known that vehicles may have imposition of external side intrusion loads during operation. As a result, vehicles have incorporated a horizontal reinforcement or door guard beam extending longitudinally in the space between the inner and outer panels. The horizontal reinforcement beam transfers side intrusion loads to the vertical pillars of the body. The horizontal reinforcement beam lessens the effects of a side intrusion load on an occupant compartment of the vehicle. While the horizontal reinforcement beam provides an advantage in lessening the effects from a side intrusion load, in certain vehicle applications, additional reinforcement may be desired to further lessen the effects of a side intrusion load on an occupant compartment of a vehicle.

SUMMARY OF THE INVENTION

Accordingly, the present invention is a door reinforcement system for closing a door opening in a side of a body of a pick-up truck including a first door and second door pivotally connected to the body and joined pillarlessly between an open position and a closed position. At least one of the first door and second door includes a vertical beam. The door reinforcement system also includes a door latch striker directly connected to the vertical beam and a door latch connected to the other one of the first door and second door to resist inward movement of the first door and second door from the closed position with respect to the body of the pick-truck.

One feature of the present invention is that a door reinforcement system is provided for a pick-up truck to improve resistance to a side intrusion load. Another feature of the present invention is that the door reinforcement system has a vertical beam constructed inside the rear door. Yet another feature of the present invention is that the door reinforcement system has a door latch striker attached directly to the vertical beam inside the rear door. Still another feature of the present invention is that the door reinforcement system has upper and lower latches in line with the vertical beam to provide a load path to the body of the pick-up truck.

Other features and advantages of the present invention will be readily appreciated as the same becomes better understood after reading the subsequent description taken in conjunction with the accompanying drawings.

2

Figure 1:
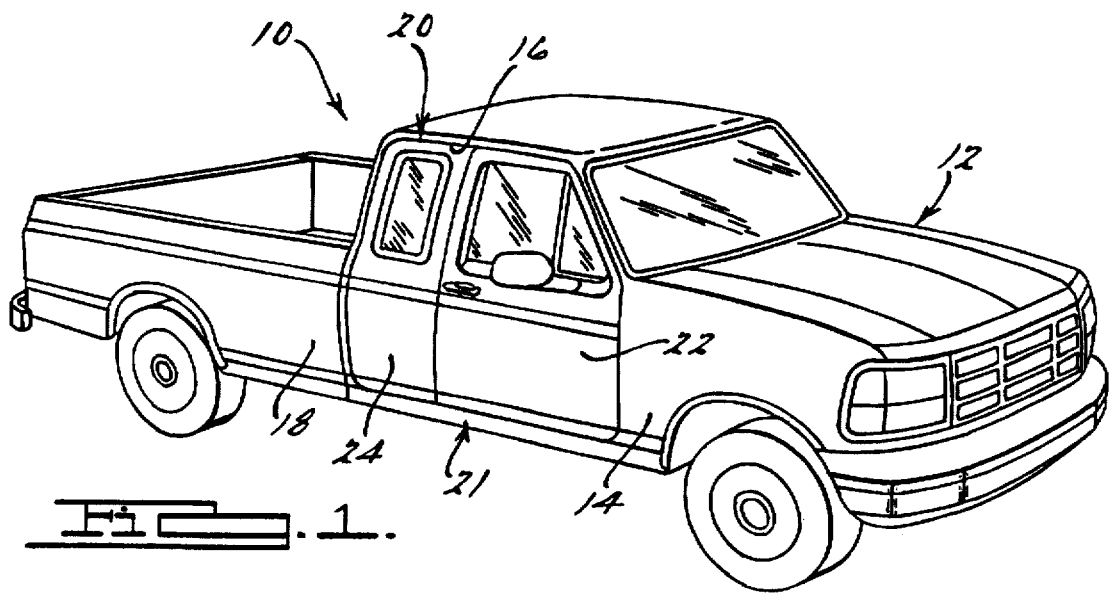
FIG. 1 is a perspective view of a door reinforcement system, according to the present invention, illustrated in operational relationship to a pick-up truck.
Figure 2:
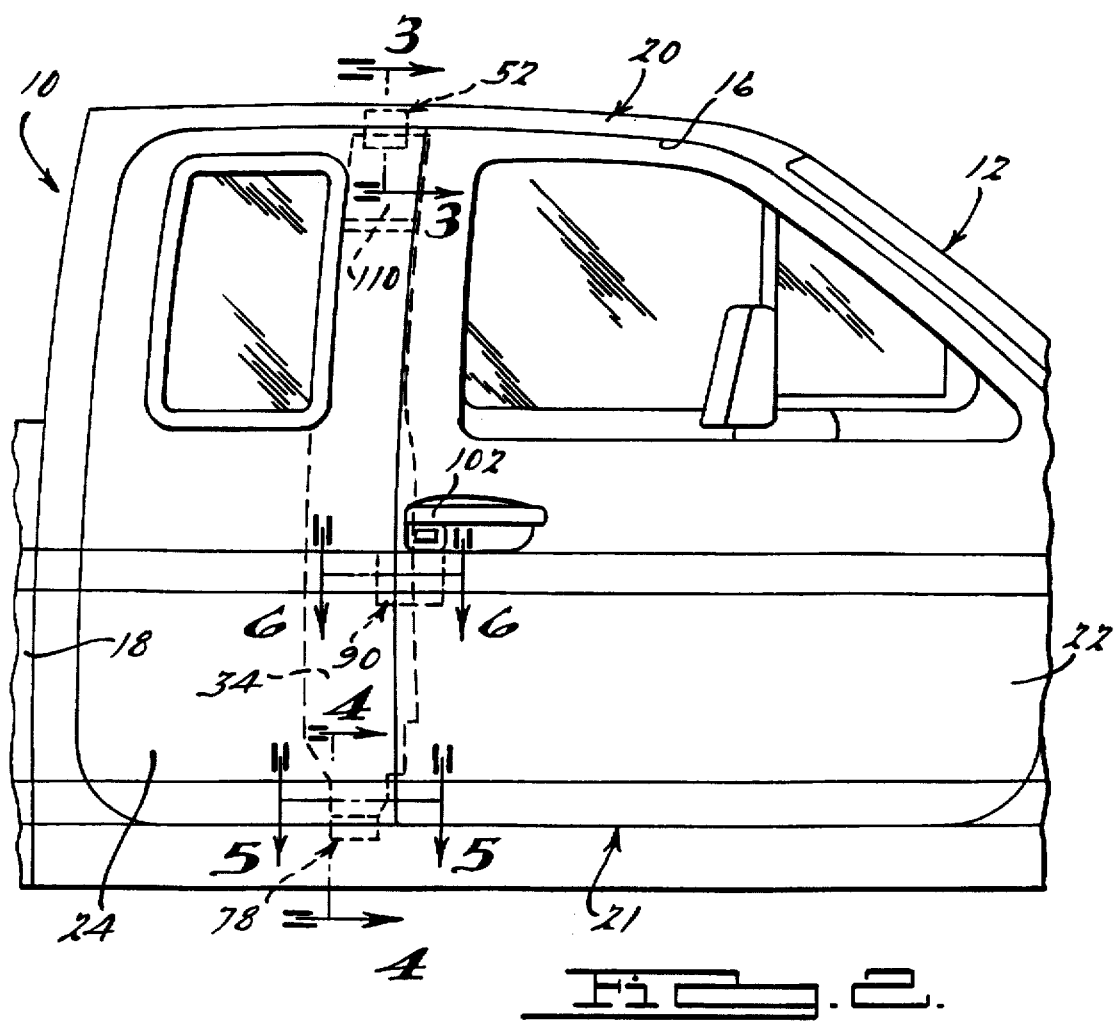

FIG. 2 is an elevational view of a portion of the door reinforcement system and pick-up truck of FIG. 1.

FIG. 3 is a sectional view taken along line 3—3 of FIG. 2.

FIG. 4 is a sectional view taken along line 4—4 of FIG. 2.

FIG. 5 is a sectional view taken along line 5—5 of FIG. 2.

FIG. 6 is a sectional view taken along line 6—6 of FIG. 2.

DESCRIPTION OF THE PREFERRED EMBODIMENT(S)

Turning now to the drawings, and in particular to FIG. 1 thereof, a door reinforcement system 10, according to the present invention, is illustrated in operational relationship to a pick-up truck, generally indicated at 12. The pick-up truck 12 includes a body 14 having an aperture or door opening 16 formed through its side 18. The body 14 includes a roof rail, generally indicated at 20, forming a top portion of the door opening 16. The body 14 also includes a rocker, generally indicated at 21, forming a lower portion of the door opening 16. It should be appreciated that vertical pillars form side portions of the door opening 16. It should also be appreciated that the door opening 16 is a continuous aperture extending longitudinally between the vertical pillars and vertically between the roof rail 20 and rocker 21.

The door reinforcement system 10 includes a pair of doors 22,24 disposed in the door opening 16 and connected to the body 14 to open and close the door opening 16. As illustrated, a front door 22 is disposed in a forward portion of the door opening 16 and pivotally connected in a known manner through hinges (not shown) to the vertical pillar of the body 14 for pivotal movement about a vertical hinge axis between open and closed positions. A rear door 24 is disposed in a rear portion of the door opening 16 and pivotally connected in a known manner through hinges (not shown) to the vertical pillar of the body 14 for pivotal movement about a vertical hinge axis between open and closed positions. It should be appreciated that the front door 22 and rear door 24 are joined pillarlessly together when in the closed position for closing the door opening 16 as illustrated in FIGS. 1 and 2. It should also be appreciated that the front door 22 and rear door 24 swing outwardly in open positions to provide access to an occupant compartment of the pick-up truck 12.

Referring to FIGS. 3 and 4, the front door 22 and rear door 24 each include an inner panel 26 and an outer panel 28 joined to the inner panel 26 and forming a space 30 there between. The inner panel 26 and outer panel 28 are jointed together by a hem flange to form a top marginal lip or edge 31 at an upper end and a bottom marginal lip or edge 32 at a lower end thereof. The rear door 24 includes a vertical reinforcement assembly comprising a vertical beam 34 and an upper latch reinforcement 110 to be described, disposed within the space 30 and extending vertically from approximately a mid-vertical point of the rear door 24 upwardly to the roof rail 20 and downwardly to the rocker 21 to overlap a floor 35 of the pick-up truck 12. The vertical beam 34 is preferably formed as a stamping and is secured to the inner panel 26 by fixed mechanical means such as welding. It should be appreciated that the front door 22 is longitudinally longer than the rear door 24 such that the vertical beam 34 is offset rearwardly from a mid or centerpoint of the door opening 16.

As illustrated in FIG. 3, the roof rail 20 is a box section having an inner panel 36 and an outer panel 37 joined to the inner panel 36 to form a space 38 therebetween. The roof rail 20 may include a reinforcement 42 disposed in the space 40 and secured to the inner panel 36 by fixed mechanical means such as welding. The rear door 24 includes an upper portion, generally indicated at 44, which extends upwardly to overlap a portion the roof rail 20. The upper portion 44 has an outer surface 46 on the outer panel 28 substantially flush with an outer surface 47 of the roof rail 20. The upper portion 44 may include a weatherstrip 48 along the inner panel 26 of the rear door 24 to engage the outer panel 37 of the roof rail 20 and seal a gap 49 between the rear door 24 and roof rail 20. The roof rail 20 may include a weatherstrip 50 along an inner and upper portion of the outer panel 37 of the roof rail 20 to engage the inner panel 26 of the rear door 24 and seal the gap 49. The roof rail 20 may include a weatherstrip 51 along a joint at a lower end of the inner panel 36 and outer panel 37 to engage the inner panel 26 of the rear door 24 and seal the gap 49.

The door reinforcement system 10 also includes an upper latch assembly, generally indicated at 52, to latchingly secure the rear door 24 to the roof rail 20 when the rear door 24 is in the closed position. The upper latch assembly 34 is located in line with a vertical axis of the vertical beam 34. The upper latch assembly 52 includes a striker 54 projecting outwardly from the inner portion of the outer panel 37 of the roof rail. The striker 54 has a generally inverted U-shape and is secured to the inner portion of the outer panel 37 by mechanical means such as fasteners 55. The upper latch assembly 52 also includes a latch 56 carried on the inner panel 26 of the rear door 24. The latch 56 rotates about a shaft 57 that is biassed by a spring 58 and has a recess 59 to receive a portion of the striker 54. The shaft 57 is pivotally connected to a latch housing 60. The latch housing 60 is secured to an upper latch reinforcement 110, which is an extension of the vertical beam 34, by fixed mechanical means such as welding. The upper latch reinforcement 110 may be integral and one-piece with the vertical beam 34. The upper latch reinforcement 110 is secured to the inner panel 26 by fixed mechanical means such as welding. The upper latch assembly 34 is conventionally locked, latched and unlatched, through mechanisms well known in the automotive body arts, including a cable 61 and an interior door handle (not shown). It should be appreciated that many combinations of latching and locking devices are possible and are well known to those skilled in the automotive body arts.

As illustrated in FIG. 4, the rocker 21 is a box section having an inner panel 62 and an outer panel 64 joined to the inner panel 62 to form a space 65 there between. The outer panel 64 has a portion 66 located inboard and extending upwardly and secured at one end to a portion of a floor pan 35 and inner panel 62. It should be appreciated that a scuff plate 68 may be disposed between the portion 66 and inner panel 26 and overlapping a portion of the floor pan 35.

The rear door 24 includes a lower portion, generally indicated at 70, which extends downwardly to overlap a portion of the rocker 21. The lower portion 70 has an outer surface 72 on the outer panel 28 substantially flush with a lower outer surface 74 of the outer panel 64 of the rocker 21. The rear door 24 may include a weatherstrip 76 along the bottom marginal edge 32 to engage the portion 66 and seal a gap 77 between the rocker 21 and the rear door 24. It should be appreciated that the front door 22 also has an upper portion 44 and lower portion 70 to overlap the roof rail 20 and rocker 21, respectively. It should also be appreciated that the front door 22 has a horizontal intrusion or reinforcement beam (not shown) which is conventional and known in the automotive body arts.

As illustrated in FIG. 5, the door reinforcement system 10 also includes a lower latch assembly, generally indicated at 78, to latchingly secure the rear door 24 to the rocker 21 when the rear door 24 is in the closed position. The lower latch assembly 78 is located in line with a vertical axis of the vertical beam 34. The lower latch assembly 78 includes a striker 80 projecting upwardly from the portion 66 of the outer panel 64 of the rocker 21. The striker 80 has a generally inverted U-shape and is secured to the portion 66 of the outer panel 64 by mechanical means such as fasteners (not shown). The lower latch assembly 78 also includes a latch 82 connected on the inner panel 26 of the rear door 24. The latch 82 rotates about a shaft 83 that is biased by a spring (not shown) and has a recess 84 to receive a portion of the striker 80. The shaft 83 is pivotally connected to a latch housing 86. The latch housing 86 is secured to the vertical beam 34 by mechanical means such as bolts (not shown). The lower latch assembly 78 is conventionally locked, latched and unlatched, through mechanisms well known in the automotive body arts, including a cable 87 and an interior door handle (not shown). It should be appreciated that many combinations of latching and locking devices are possible and are well known to those skilled in the automotive body arts.

Referring to FIG. 6, the door reinforcement system 10 includes a side latch assembly, generally indicated at 90, to hold the doors 22,24 fast in the closed position. As illustrated, the side latch assembly 90 includes a striker 92 carried by the rear door 24 and a latch 94 carried by the front door 22 to engage the striker 92. The striker 92 has a generally "L" shape and is connected to a bracket 96 which is secured by mechanical means such as fasteners (not shown) directly to the vertical beam 34. The striker 92 extends longitudinally through an aperture 98 in the outer panel 28 to engage the latch 94. The latch 94 is secured by mechanical means such as fasteners (not shown) to a reinforcement member 100 which is connected to the inner panel 26 by fixed mechanical means such as welding. The side latch assembly 90 is conventionally locked, latched and unlatched, through mechanisms well known in the automotive body arts, including an outer door handle 102 (FIG. 2). Additionally, a longitudinal edge of the inner panel 26, and outer panel 28 are joined together to form a side marginal lip or edge 104 along the rear door 24 and may includes a weatherstrip 106 along the side marginal edge 104 to engage the inner panel 26 of the front door 22 and seal a gap 108 between the rear door 24 and front door 22.

Upon imposition of an excessive or side intrusion load on the outer panel 28 of the front door 22 and rear door 24, the tendency of the doors 22,24 to deflect inward toward the interior or occupant compartment of the pick-up truck 12 is resisted in part by the vertical reinforcement assembly and the portions 44 and 70 overlapping the roof rail 20 and rocker 21, respectively. The upper and lower latch assemblies 52 and 78 are in line with the vertical reinforcement assembly to provide a load path to the body 14. It should be appreciated that the vertical reinforcement assembly receives load through the side latch assembly 90 and transmit the load to the floor and roof of the pick-up truck 12.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A door reinforcement system for closing a continuous door opening formed through a side of a body of a pick-up truck comprising:

a rocker at a bottom portion of the door opening;

a roof rail at a top portion of the door opening;

a first door pivotally connected to the body and a second door pivotally connected to the body for pivotal movement between an open position and a closed position closing the door opening;

a vertical reinforcement beam disposed within said second door and extending from said roof rail to said rocker; and a side door latch striker connected directly to said vertical reinforcement beam and a side door latch connected to said first door to engage said side door latch striker to resist inward movement of said first door and said second door from said closed position with respect to the body of the pick-up truck upon imposition of an excessive or side intrusion load on an outer panel of said first door and said second door.

2. A door reinforcement system as set forth in claim 1 wherein said first door comprises a front door pivotally connected to the body at a front portion of the door opening and said second door comprises a rear door pivotally connected to the body at a rear portion of the door opening.

3. A door reinforcement system as set forth in claim 1 wherein said vertical reinforcement beam is offset rearwardly from a centerpoint of said door opening.

4. A door reinforcement system for closing a continuous door opening formed through a side of a body of a pick-up truck comprising:

a rocker at a bottom portion of the door opening;

a roof rail at a top portion of the door opening;

a front door pivotally connected to the body at a front portion of the door opening and a rear door pivotally connected to the body at a rear portion of the door opening for pivotal movement between an open position and a closed position closing the door opening;

a vertical reinforcement beam disposed within said rear door and extending from said roof rail to said rocker;

a side door latch connected to said front door; and a side door latch striker connected directly to said vertical reinforcement beam to engage said side door latch to resist inward movement of said front door and said rear door from said closed position with respect to the body of the pick-up truck upon imposition of an excessive or side intrusion load on an outer panel of said front door and said rear door.

5. A door reinforcement system as set forth in claim 4 wherein said vertical reinforcement beam is located at a forward portion of said rear door and offset rearwardly from a centerpoint of said door opening.

6. A door reinforcement system for closing a continuous door opening formed through a side of a body of a pick-up truck comprising:

a rocker at a bottom portion of the door opening;

a roof rail at a top portion of the door opening;

a front door pivotally connected to the body at a front portion of the door opening and a rear door pivotally connected to the body at a rear portion of the door opening for pivotal movement between an open position and a closed position closing the door opening;

a vertical reinforcement beam disposed within said rear door at a forward portion thereof and extending from said roof rail to said rocker and offset rearwardly from a center point of the door opening;

a side door latch connected to said front door; and a side door latch striker connected directly to said vertical reinforcement beam to engage said side door latch to resist inward movement of said front door and said rear door from said closed position with respect to the body of the pick-up truck upon imposition of an excessive or side intrusion load on an outer panel of said front door and said rear door.

* * * * *